Jan. 1, 1929.  J. A. PROCTOR ET AL  1,697,477
ELECTRICAL CONDENSER
ELECTRIC CONDENSER
Filed Jan. 23, 1925
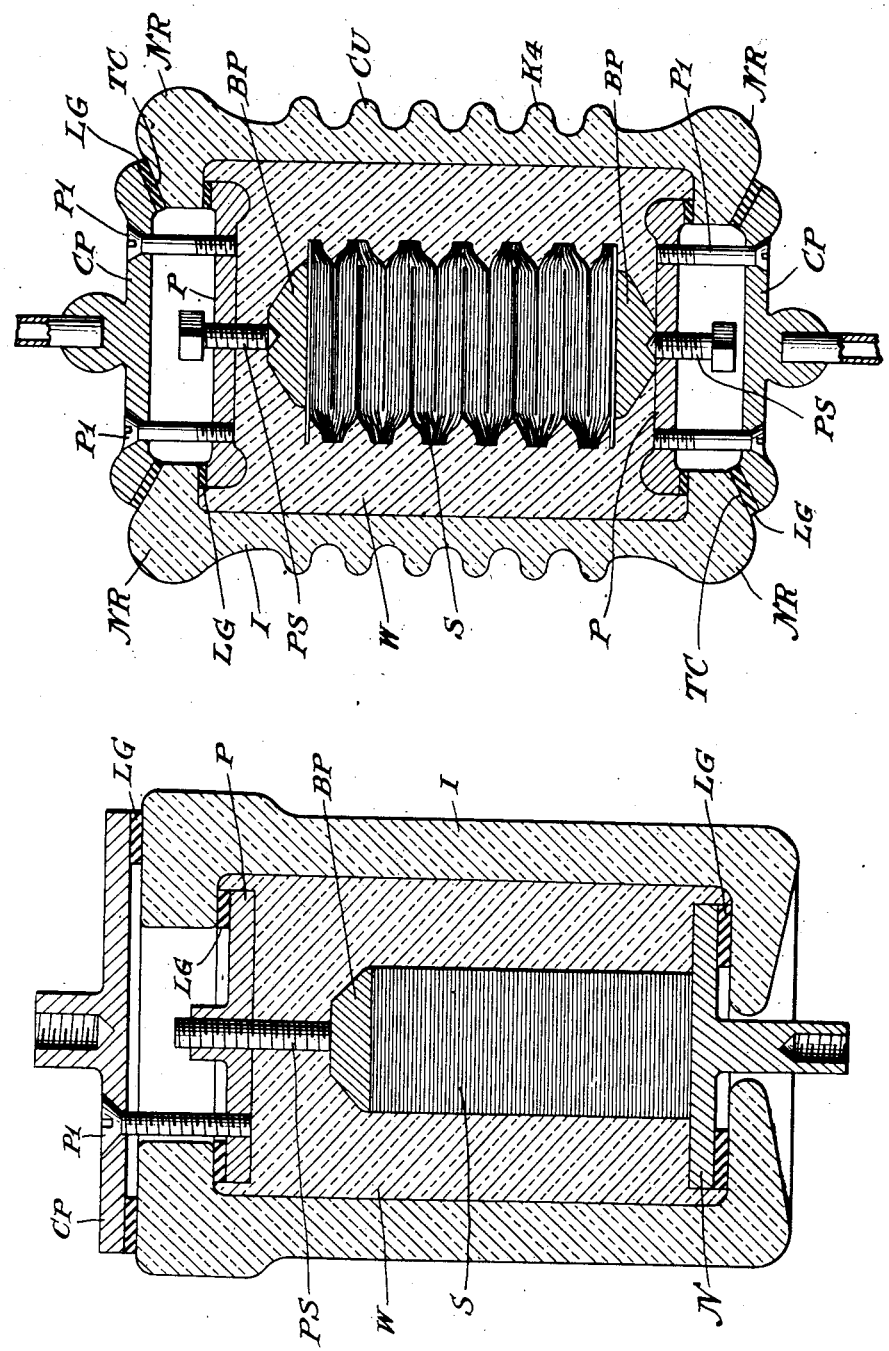
INVENTORS
John A. Proctor
William M. Bailey
BY
ATTORNEY Patented Jan. 1, 1929.

1,697,477

UNITED STATES PATENT OFFICE.

JOHN A. PROCTOR, OF LEXINGTON, AND WILLIAM M. BAILEY, OF LYNN, MASSACHU-
SETTS, ASSIGNORS TO WIRELESS SPECIALTY APPARATUS COMPANY, OF BOSTON,
MASSACHUSETTS, A CORPORATION OF MASSACHUSETTS.

ELECTRICAL CONDENSER.     REISSUED

Original application filed January 23, 1925, Serial No. 4,150. Divided and this application filed September
18, 1925. Serial No. 57,073.

This application is a division of our application Serial Number 4,150 filed January 23, 1925.

This invention relates to improvements in electrical condensers, particularly in high potential condensers, and more particularly of the sheet-stack type, especially wherein the stack for high potential service comprises a plurality of sections insulated from one another by insulating sheets between the sections in the stack and connected in series with one another by connections outside the stack.

Among the various objects of the invention is that of providing a structure which is an improvement on the special type wherein the stack is contained in a substantially or more or less tubular casing which consists of insulating material preferably such as porcelain and which is provided with metal ends which serve to clamp the stack under high compression inside the casing, to complete the enclosure of the stack and to serve as electrical terminals at high potential difference which lie at opposite ends of the structure separated from one another by the insulating walls of such casing. As shown in the drawings, the tubular casing at at least one and preferably both ends has an integral inwardly projecting shoulder for co-operation with the adjacent metal end.

The invention consists of the various features of construction substantially as described hereinafter and as shown in the drawings, of which Figure 1 is a central vertical section of a complete condenser unit, and Fig. 2 is a similar view of a modification.

In this condenser the stack S preferably consists of series-connected sections, which are insulated from one another by mica sheets projecting outside of the stack of metal foils, as usual, each section consisting of alternating mica sheets and foils sheets. This construction results in a high potential difference across the end sections of stack S when, as usual, the foils of opposite polarity which project from opposite ends of each section are soldered or fused to the like foils of adjacent sections.

In this invention, the casing for stack S consists of a tube I of porcelain, such material being that heretofore extensively employed in high potential insulators, but here serving as a casing for stack S. The open ends of this porcelain casing are closed by metal end structures.

The bottom end member N (Fig. 1) is preferably of malleable iron, and is one of the compression members of the clamping system for stack S, which rests upon it, the member N constituting a terminal of the condenser. In assembling, the foils of the bottom section of stack S are electrically connected to terminal member N, in any desired manner. End N closes and seals the lower end of casing I.

On top of stack S is placed a metal bearing plate BP. Stacks S may be embedded in paraffin wax or submerged in oil; but owing to the insulation provided by the insulating material comprising casing I, between the metal ends of the stack, the only function of the wax or oil, if used, is to prevent flashover from stack-section to stack-section. Stack S may lie as close as desired to the interior wall of casing I, so that a compact over-all structure is permitted. The exterior wall of casing I preferably is glazed. The inside wall of casing I is unglazed to permit intimate contact by wax or oil W, to seal against moisture and prevent leakage path between terminals.

The bottom opening in casing I preferably is small, but large enough to permit exit of one circuit terminal or lead. The top central opening of casing I preferably is larger. The porcelain wall at the top of casing I and at the upper portion of the sides thereof is of even greater thickness than the thick side walls, in order to provide greater strength at such points where the clamping strains are transmitted to the porcelain casing as a whole as the tension member of the stack-clamping system. Metal bottom plate N is the lower compression member of the clamping system and is located inside casing I, being inserted therein thru the larger top opening. Member N preferably rests on a lead gasket LG, which protects the porcelain or pyrex glass of the casing equalizing the downward pressure on it by plate N and flowing under any irregularities in the bearing shoulder of the casing, thereby providing an even bearing surface for the member N. The circuit terminal or lead projecting through the small bottom opening of casing I may consists of an integral extension from plate N.

The metal top construction is as follows. The bearing plate BP on top of stack S is forced down on the stack by screw PS. The upper end of screw PS engages in a metal pressure plate P, which thereby, when the screw is adjusted to compress the stack, is forced upwardly against a lead gasket LG, which separates plate P from the inner wall of the top of insulating casing I. A cover plate CP is secured to the assembly by screws P¹, which extend down into plate P, a lead gasket LG preferably being located between plate CP and insulating casing I. Plate CP seals the interior of the condenser from access of moisture from outside, and performs no clamping function. Here, the insulating casing I constitutes the tension member of the stack-clamping system. Plate CP, as shown, may be provided with an upward extension to serve as the second circuit terminal, and this may be threaded as shown, as in the case of the extension from lower plate N.

The ends of casing I and of the metal end members should be parallel with one another. The casing I, of the form shown in Fig. 1, may be provided with the corrugations, skirts or petticoats K⁴ shown in Fig. 2, to increase the leakage distance of high potential flashover from one metal end to another over the glazed porcelain exterior of casing I. The glaze seals the porcelain pores and assists in shedding water and dirt. The corrugations, in addition to increasing the flashover distance, also assist in shedding water and dirt and provide surfaces beneath them which are protected more or less from access of moisture and dirt; and they serve to increase the mechanical strength of the porcelain casing, in this sense constituting a thick casing wall with or without excessive thickness of the rest of the casing wall. The condenser hereof is a weatherproof and waterproof high potential condenser which is designed for outdoor service in connection with adjacent high tension lines.

Between the top of stack S and the upper end of casing I is a space which provides tolerance for stacks of varying length and substantially the same capacitance; pressure screw PS being sufficiently long for this purpose.

Pressure plate P is applied before the application of the sealing or cover-plate CP. Plate P (with screw PS) clamps stack S under high compression of the order of a thousand pounds more or less per square inch of active area of the stack. Plate P preferably is of steel. When it is applied, together with screw PS, the lower end of the latter bears down on member BP, and further adjustment of screw PS pushes plate P upwardly against the inner top wall of casing I, so that the latter becomes the tension member of the stack-clamping system.

The condenser unit is now complete save for the sealing or cover-plate CP, of steel, for water and weather protection of the interior of the condenser. This plate CP performs no compressing function. It is secured in place by an annular series of screws P¹, which enter plate P. Screws P¹ provide the electrical connection between plates P and CP. Thus cover-plate CP and bottom end N are the opposite potential terminals of the condenser at high potential difference.

Casing I, while preferably of porcelain, may be in some cases of other insulating material such as, preferably, pyrex glass, and even micarta, bakelite, etc. Porcelain or pyrex glass, however, are preferred for the weatherproof form, being better for this type of condenser generally on account of their strength which is availed of in special ways by this invention, the structural weakness of the porcelain or glass in other respects being sufficiently discounted by adequate thickness of the casing walls as shown in proportion. In practice, this condenser unit has dimensions which over-all and in detail are larger by several times than the dimensions of the drawings.

This structure provides a strong clamping-casing notwithstanding the fact that it consists largely of insulating material, no kind of insulating material having structural strength compared to metal. In this structure there are no metal parts which lie between the two opposite potential ends and terminals, save only the stack-armatures, i. e., the metal foils. Also, there is ample leakage or flashover path over an ideal insulator between the metal ends. By virtue of the special construction disclosed herein, the fair degree of structural strength of the porcelain or pyrex glass is utilized and its weakness as a material is minimized. The metal ends perform four functions, (1) compress the stack; (2) serve as condenser terminals; (3) serve as localizers of electrostatic fields at opposite potential ends of the stack; and (4) may serve as means by which successive condenser units, arranged end to end, may be mounted together. On account of the insulation provided by casing I, the problem is entirely eliminated which has been involved in series sectional high potential condensers in connection with the insulation of a high potential terminal from a metal stack-casing out thru which such terminal extends from the stack.

The condenser units hereof are designed for low current service (at high potential) and, therefore, no special means is shown to provide for heat dissipation, other than the metal end structures and the insulating filler, such as wax or oil W, when used. In other and higher current uses of the invention, however, such special heat-dissipating means may be incorporated as desired by the designer.

The condenser units hereof are designed particularly for outdoor use in arrangements of plural units, as high potential, low-current condensers for coupling carrier-wave transmitting apparatus to a high potential transmission line. The line may carry power currents of the order of tens of kilovolts. The potential across each of a plurality of combined condenser units hereof may be over twenty thousand volts. The function of the condensers is to provide a good path for the radio frequency carrier currents but at the same time a poor path for the higher voltage line current.

In the modification of Fig. 2, the insulating casing I, preferably of porcelain or pyrex glass, is similar to that of Fig. 1, save that its exterior is provided with the corrugations K⁴ and save that all four corners NR are thickened for extra strength at such points, where the clamping strains are transmitted to the casing acting as the tension member of the stack-clamping system. The metal end structures are duplicated at the two ends of casing I, as follows. Two metal plates BP are located at the ends of stack S, as bearing plates, each with an adjusting screw PS which passes thru a pressure plate P. Casing I at top and bottom has a tapered portion TC. Metal end members CP have correspondingly tapered surfaces, the cooperating tapers of metal and insulating parts being separated by lead gasket LG. Metal sealing covers CP are secured by screws P¹ to pressure plates P, the latter being separated by lead gaskets LG from the inner wall of insulating casing I. When screws PS are moved toward bearing plates BP, the pressure plates P are moved in the opposite direction more tightly against the end of casing I, thereby putting stack S under compression and making casing I the tension member of the clamping system. Since plates CP here perform no clamping function, as in Fig. 1, they are applied to the assembly after final adjustments of screws PS, as in Fig. 1.

In the claims the specification of the casing as consisting of porcelain is intended to include all patentable novelty as to such specific material itself, in addition to other materials of functional equivalency, including pyrex glass, in the several combinations of the claims.

We particularly point out and distinctly claim the part, improvement or combination which we claim as our invention or discovery, as follows:—

1. The combination with an electrical condenser stack to be enclosed and compressed, of a porcelain casing surrounding the stack, a clamping terminal located inside the said casing at one end of the stack; and a device located inside the casing at the other end of the stack and forcing the stack against said clamping terminal and thereby against the casing as a tension member of means clamping the stack.

2. The combination with an electrical condenser stack, and a porcelain casing surrounding said stack, of a clamping terminal located inside the casing and between an end of the stack and an end of the casing; another clamping terminal located at the other end of the stack and casing; and clamping means forcing the stack ends together and said terminals apart and putting the stack under compression and the porcelain casing under tension.

3. The combination with an electrical condenser stack, of a porcelain casing surrounding it, and metal clamping members located inside the casing and compressing the stack between them therein and arranged to put the porcelain casing under tension as a tension element of the complete clamping means for the stack.

4. The combination with an electrical condenser stack, of a porcelain casing therefor having end openings; a metal clamping terminal closing one end of the casing and receiving a compression thrust from one end of the stack; a metal structure at the other end of the casing transmitting compression strains on the stack to the casing as a tension member; and a metal cover secured to said last specified metal structure and closing the adjacent opening in the casing.

5. The combination with an electrical condenser stack, of a porcelain casing therefor having open ends; a metal clamping terminal closing one end of the casing and receiving a compressing thrust from an end of the stack; a metal structure at the other end of the casing and transmitting stack compression strains to the casing as a tension member; and a metal cover closing said other end of the casing.

6. The combination with an electrical condenser stack, of a porcelain casing therefor having opposite end openings; a metal clamping terminal closing one end of the casing; a metal cover closing the other end of the casing; and a metal member secured to said cover and transmitting stack compression strains to the casing as a tension member.

7. The combination with an electrical condenser stack, of a generally tubular porcelain casing therefor having at an end an integral inwardly projecting shoulder; a metal plate inside said casing and engaging the inner wall of said shoulder; and a stack clamping device inside the casing and between the stack and said plate and forcing them apart, thereby transmitting stack-clamping strains by way of said plate to the casing as a tension member.

8. The combination with an electrical condenser stack, of a generally tubular insulating casing therefor having at its ends integral inwardly projecting shoulders; a metal member inside the casing at one end thereof and receiving compression strains from the adjacent end of the stack and thereby forced against the interior of one end shoulder of the casing; and a metallic structure at the other end of the stack and casing, through which compression strains on the stack and against the other shoulder of the casing are exerted.

9. The combination with an electrical condenser stack, of generally tubular insulating casing therefor having at its ends integral inwardly projecting shoulders; a metal member inside the casing at one end thereof and receiving compression strains from the adjacent end of the stack and thereby forced against the interior of one end shoulder of the casing; and a metallic structure also inside the casing and at the opposite end of the casing and stack, exerting compression strains on the stack and, cooperatively with said metal member, exerting tension strains on the interior of the other end shoulder of the insulating casing.

10. The combination with a series-sectional condenser stack to be enclosed and highly compressed, of a casing of structural insulating material enclosing such stack and formed at one end with an integral inwardly projecting shoulder defining a small opening; a metal plate lying between an end of the stack and the interior wall of said shoulder and receiving a compression thrust on the other end of the stack, said plate being too large to be insertible thru said small opening, and a terminal-lead extending from said plate out thru said opening; said casing having an opening opposite said lead-opening and of sufficient size to permit insertion of said plate; and a metal stack-clamping structure at the end of the casing having the larger opening, and arranged to transmit the compression strains of the clamp to the insulating casing.

11. The combination with a series-sectional condenser-stack to be enclosed and highly compressed, of a casing enclosing such stack and formed with an integral inwardly-projecting shoulder defining a small opening; a stack-end-clamping member lying between an end of the stack and the interior wall of said shoulder and closing said small opening; said clamping-member being too large to be insertible thru said small opening; and a terminal lead extending from out thru said small opening; said casing having an opening opposite said lead-opening and of sufficient size to permit insertion of said clamping member and the stack for assembly with the casing; and a second stack-end-clamping member extending across said larger opening and taking the clamping stresses at the other end of the stack.

12. The combination with a series-sectional condenser-stack to be enclosed and highly compressed, of a casing of structural insulating material enclosing such stack and formed with two openings opposite one another and opposite the ends of the stack, said insulating casing having integral inwardly projecting walls defining said respective openings; and metal stack-clamping devices located between the inner faces of said inwardly projecting integral walls respectively and the respective ends of the stack.

This specification signed this 11th day of September, 1925.

JOHN A. PROCTOR.
WILLIAM M. BAILEY.